US010721635B2

(12) United States Patent
Fujishiro et al.

(10) Patent No.: US 10,721,635 B2
(45) Date of Patent: Jul. 21, 2020

(54) BASE STATION AND RADIO TERMINAL

(71) Applicant: KYOCERA CORPORATION, Kyoto (JP)

(72) Inventors: Masato Fujishiro, Yokohama (JP); Henry Chang, San Diego, CA (US); Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/144,879

(22) Filed: Sep. 27, 2018

(65) Prior Publication Data

US 2019/0037420 A1    Jan. 31, 2019

Related U.S. Application Data

(63) Continuation of application No. PCT/JP2017/011818, filed on Mar. 23, 2017.

(60) Provisional application No. 62/335,856, filed on May 13, 2016, provisional application No. 62/316,765, filed on Apr. 1, 2016.

(51) Int. Cl.
*H04W 24/00* (2009.01)
*H04W 24/02* (2009.01)
*H04W 76/27* (2018.01)
*H04W 52/02* (2009.01)
*H04W 76/20* (2018.01)
*H04W 64/00* (2009.01)

(52) U.S. Cl.
CPC ......... *H04W 24/02* (2013.01); *H04W 52/02* (2013.01); *H04W 64/00* (2013.01); *H04W 76/20* (2018.02); *H04W 76/27* (2018.02); *H04W 52/0225* (2013.01); *Y02D 70/00* (2018.01); *Y02D 70/24* (2018.01)

(58) Field of Classification Search
CPC ..... H04W 24/02; H04W 76/20; H04W 76/27; H04W 4/021; H04W 52/02; H04W 52/0225; Y02D 70/00
USPC .................. 455/456.5, 550.1, 418
See application file for complete search history.

(56) References Cited

U.S. PATENT DOCUMENTS

| 9,992,719 B2 * | 6/2018 | Melin ............... H04W 36/0083 |
| 2005/0009527 A1 | 1/2005 | Sharma |
| 2005/0250517 A1 * | 11/2005 | Fukui ..................... G08G 1/207 |
| | | 455/456.4 |

(Continued)

FOREIGN PATENT DOCUMENTS

| JP | 2009-118521 A | 5/2009 |
| JP | 2013-197635 A | 9/2013 |
| WO | 2009/154102 A1 | 12/2009 |

OTHER PUBLICATIONS

Intel Corporation; "Further enhancements on signalling reduction to enable light connection for LTE"; 3GPP TSG RAN Meeting #71; RP-160425; Mar. 7-10, 2016; Gothenburg, Sweden.

*Primary Examiner* — Danh C Le
(74) *Attorney, Agent, or Firm* — Studebaker & Brackett PC

(57) ABSTRACT

A radio terminal according to an embodiment is used in a mobile communication system. The radio terminal includes a controller configured to transmit, to a base station, information notifying or requesting that the radio terminal transitions to an RRC idle state if the radio terminal is in a specific state. The specific state is a state in which signaling is reduced as compared with the RRC connected state and context information of the radio terminal is maintained in the network.

7 Claims, 10 Drawing Sheets

(56) References Cited

U.S. PATENT DOCUMENTS

| | | | |
|---|---|---|---|
| 2008/0284588 A1* | 11/2008 | Kim | G01S 19/48 340/539.13 |
| 2009/0233574 A1* | 9/2009 | Shinozaki | G01S 5/0263 455/404.2 |
| 2010/0316034 A1* | 12/2010 | Burbidge | H04W 36/0022 370/338 |
| 2011/0194432 A1 | 8/2011 | Kato et al. | |
| 2012/0276915 A1* | 11/2012 | Kubota | H04B 7/024 455/452.1 |
| 2013/0009877 A1* | 1/2013 | Sosby | H04M 1/274558 345/169 |
| 2013/0194991 A1* | 8/2013 | Vannithamby | H04W 4/70 370/311 |
| 2014/0226542 A1* | 8/2014 | Gupta | H04B 15/00 370/280 |
| 2014/0295820 A1* | 10/2014 | Kim | H04W 52/0216 455/418 |
| 2015/0036574 A1 | 2/2015 | Uemura et al. | |
| 2015/0199892 A1* | 7/2015 | Johnson | G08B 21/0476 348/77 |
| 2016/0044633 A1 | 2/2016 | Zhang et al. | |
| 2016/0057730 A1 | 2/2016 | Truelove et al. | |
| 2016/0119481 A1* | 4/2016 | Rein | H04M 3/54 348/14.01 |
| 2016/0174280 A1* | 6/2016 | Singh | H04W 76/15 370/329 |
| 2016/0277597 A1* | 9/2016 | Ohara | G06F 21/31 |
| 2017/0034870 A1* | 2/2017 | Uchino | H04W 52/0216 |
| 2017/0078694 A1* | 3/2017 | Kusano | H04N 19/167 |
| 2017/0094597 A1* | 3/2017 | Su | H04W 52/0209 |
| 2017/0257822 A1* | 9/2017 | Harris | H04W 48/12 |
| 2018/0092155 A1* | 3/2018 | Hong | H04W 48/20 |
| 2018/0270791 A1* | 9/2018 | Park | H04W 68/04 |
| 2018/0270894 A1* | 9/2018 | Park | H04W 76/27 |
| 2018/0271410 A1* | 9/2018 | Rawal | A61B 5/0022 |
| 2018/0310358 A1* | 10/2018 | Li | H04W 76/30 |
| 2018/0317139 A1* | 11/2018 | Li | H04W 52/0209 |
| 2019/0014515 A1* | 1/2019 | Zee | H04W 36/08 |
| 2019/0021064 A1* | 1/2019 | Ryu | H04W 76/27 |

* cited by examiner

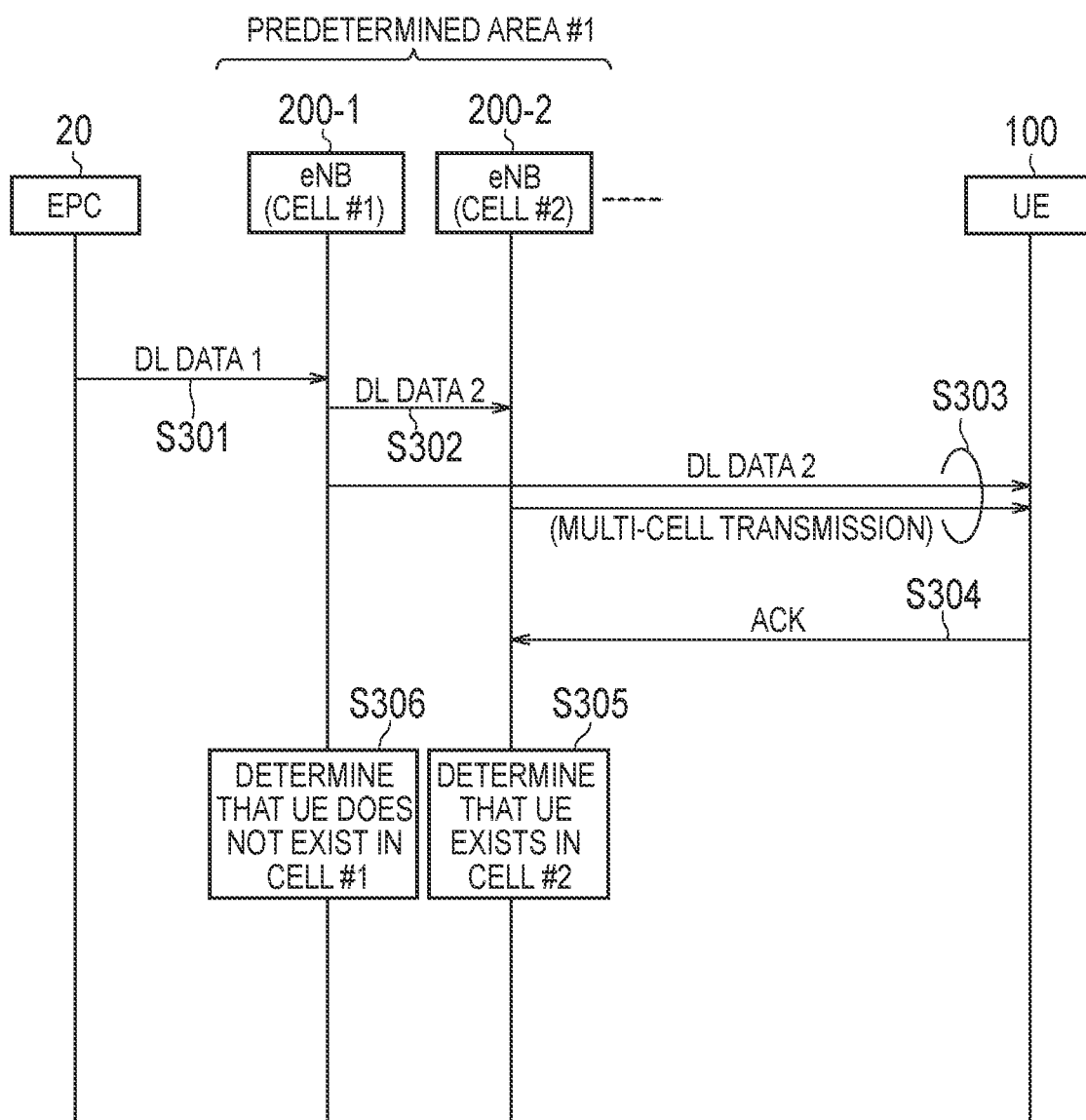

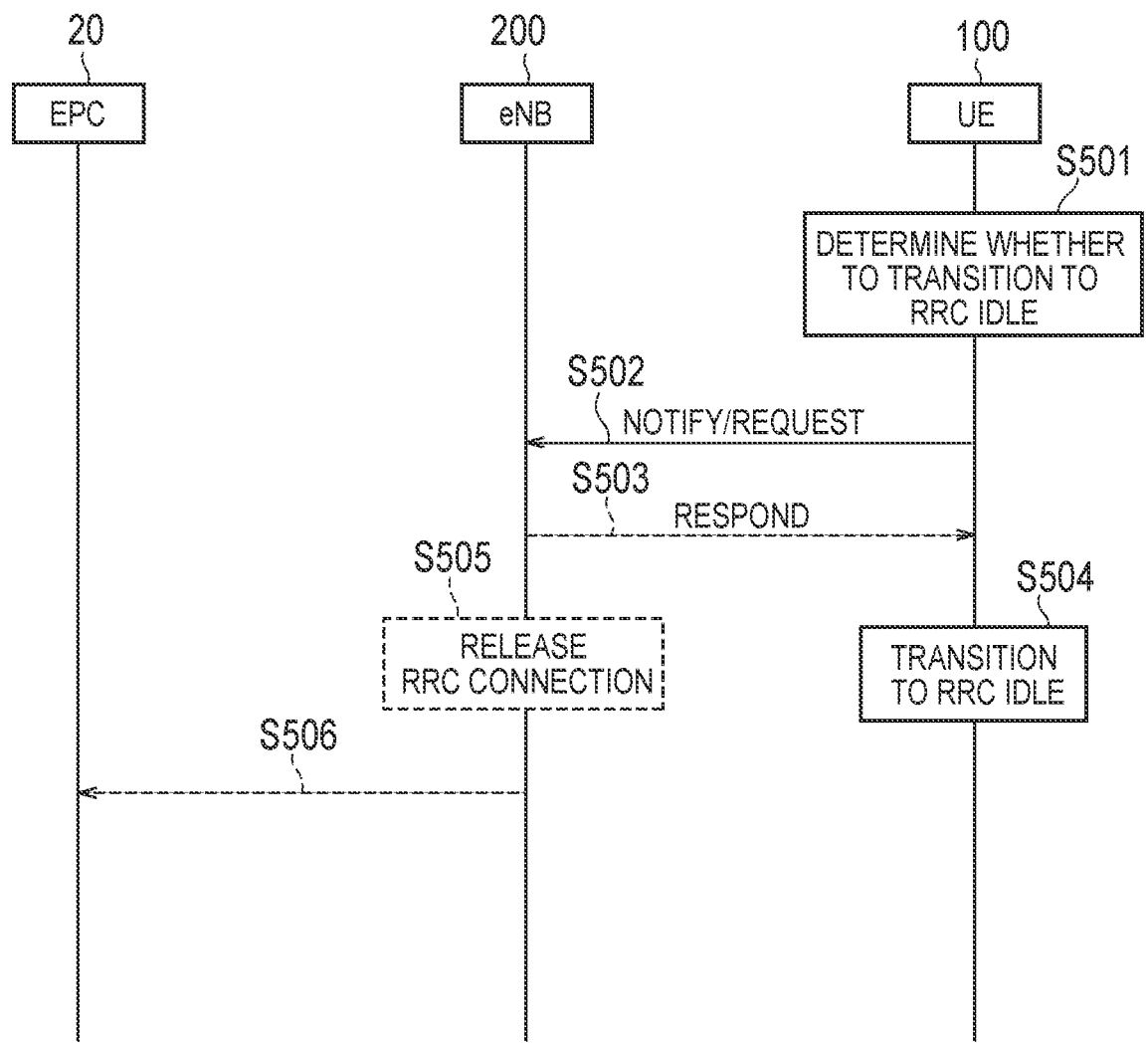

BASE STATION AND RADIO TERMINAL

RELATED APPLICATION

This application is a continuation application of international application PCT/JP2017/011818, filed Mar. 23, 2017, which claims the benefit of U.S. Provisional Application No. 62/316,765, filed Apr. 1, 2016, and U.S. Provisional Application No. 62/335,856, filed May 13, 2016, the entire contents of which are incorporated herein by reference.

TECHNICAL FIELD

The present disclosure relates to a base station and a radio terminal used in a mobile communication system.

BACKGROUND ART

In recent years, with the spread of radio terminals such as smartphones capable of executing a lot of applications, the frequency at which a radio terminal connects to a network and the frequency at which a network performs paging of a radio terminal are increasing.

Therefore, in a mobile communication system, network load accompanying signaling is increasing. In view of such a situation, techniques for reducing signaling are being studied in the 3rd Generation Partnership Project (3GPP), which is the standardization project for mobile communication systems.

SUMMARY

A radio terminal according to an embodiment is used in a mobile communication system. The radio terminal includes a controller configured to transmit, to a base station, information notifying or requesting that the radio terminal transitions to an RRC idle state if the radio terminal is in a specific state. The specific state is a state in which signaling is reduced as compared with the RRC connected state and context information of the radio terminal is maintained in the network.

A radio terminal according to an embodiment is used in a mobile communication system. The radio terminal includes: a controller configured to transmit, to a network, a notification indicating a movement in response to recognizing the movement of the radio terminal to the outside of a predetermined area formed by a group of cells or base stations. The predetermined area is applied while the radio terminal is in a specific state. The specific state is a state in which signaling is reduced as compared with an RRC connected state while context information of the radio terminal is maintained in the network.

A base station according to an embodiment is used in a mobile communication system. The base station includes a controller configured to, if a radio terminal is in a specific state, transmit downlink data to the radio terminal without transmitting a paging message to the radio terminal. The specific state is a state in which signaling is reduced as compared with an RRC connected state while context information of the radio terminal is maintained in the network.

A radio terminal according to an embodiment is used in a mobile communication system. The radio terminal includes a controller configured to, if the radio terminal is in a specific state and uplink synchronization is not established, start a random access procedure to a base station in response to a radio terminal's reception of downlink data from the base station. The specific state is a state in which signaling is reduced as compared with an RRC connected state and context information of the radio terminal is maintained in the network. The controller is configured to start the random access procedure according to the reception of the downlink data even before uplink data is generated in the radio terminal.

A radio terminal according to an embodiment is used in a mobile communication system. The radio terminal includes a controller configured to receive a configuration of a specific state from a base station by signaling dedicated to the radio terminal and transition from an RRC connected state to the specific state in response to reception of the configuration. The specific state is a state in which signaling is reduced as compared with the RRC connected state and context information of the radio terminal is maintained in a network. The controller is configured to discard the configuration in response to the transition from the specific state to the RRC connected state.

A radio terminal according to an embodiment is used in a mobile communication system. The radio terminal includes a controller configured to, if the radio terminal is in a specific state, stop the specific state in response to satisfaction of a predetermined condition. The specific state is a state in which signaling is reduced as compared with the RRC connected state and context information of the radio terminal is maintained in a network. The controller is configured to receive, from a base station, information configuring an operation of the radio terminal when the specific state is stopped. The controller is configured to perform the operation configured by the base station when the specific state is stopped.

A radio terminal according to an embodiment is used in a mobile communication system. The radio terminal includes a controller configured to perform a first intermittent reception if the radio terminal is in an RRC connected state or an RRC idle state and perform a second intermittent reception if the radio terminal is in a specific state. The specific state is a state in which signaling is reduced as compared with the RRC connected state and context information of the radio terminal is maintained in a network. The second intermittent reception is an intermittent reception in which a range of frequencies to be monitored is limited as compared with the first intermittent reception.

BRIEF DESCRIPTION OF DRAWINGS

FIG. 12 is a diagram illustrating an operation according to modification 1 of a third embodiment.

FIG. 13 is a diagram illustrating an operation according to a fifth embodiment.

DESCRIPTION OF EMBODIMENTS

First Embodiment (Architecture of Mobile Communication System)

Figure 1:
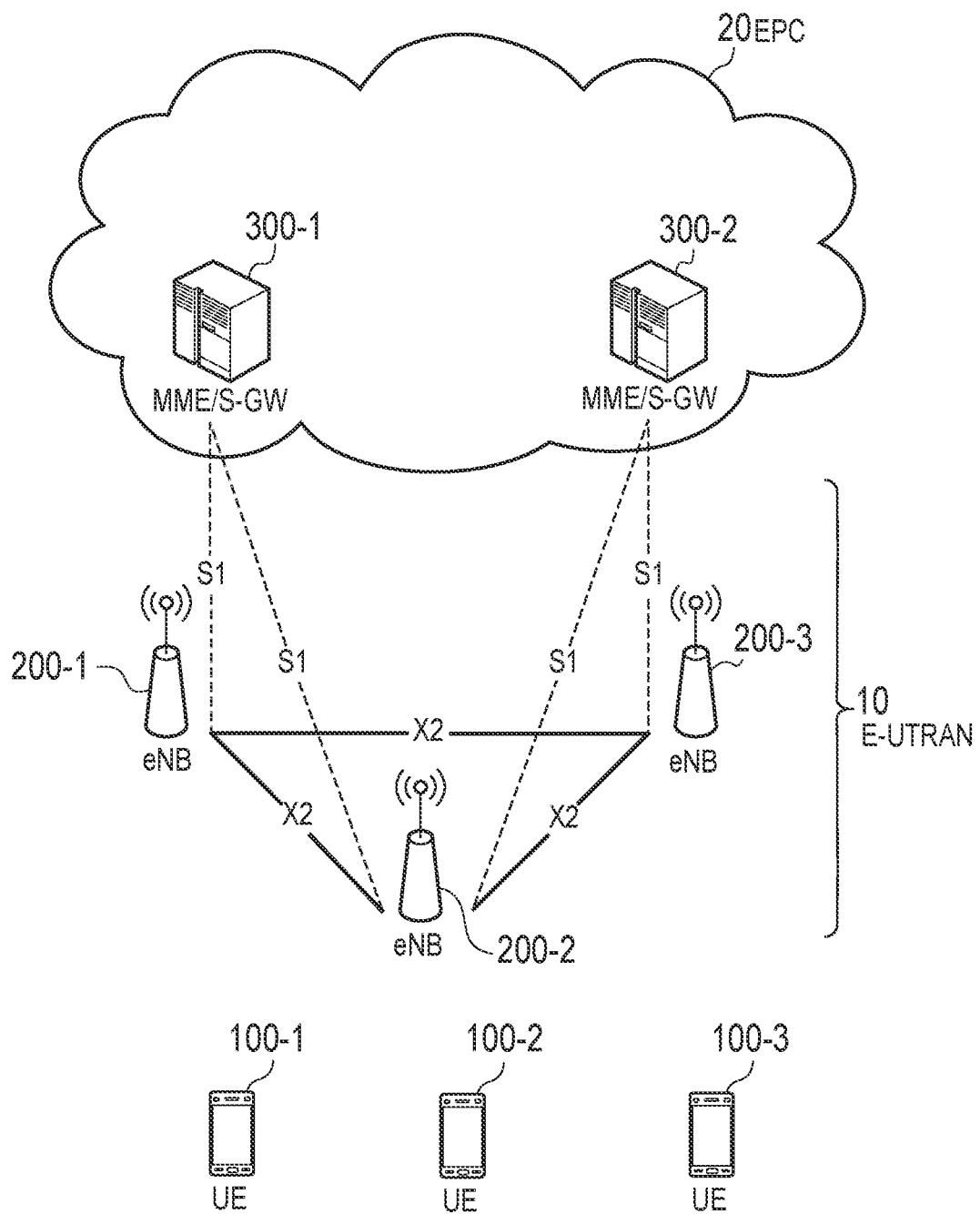
FIG. 1 is a diagram illustrating an architecture of an LTE system according to an embodiment.

Hereinafter, an architecture of a mobile communication system according to a first embodiment will be described. FIG. 1 is a diagram illustrating an architecture of a Long Term Evolution (LTE) system that is the mobile communication system according to the first embodiment. The LTE system is a mobile communication system based on the 3GPP standard.

As illustrated in FIG. 1, the LTE system includes a user equipment (UE) 100, an evolved-UMTS terrestrial radio access network (E-UTRAN) 10, and an evolved packet core (EPC) 20.

The UE 100 corresponds to a radio terminal. The UE 100 is a mobile communication apparatus and performs radio communication with a cell (serving cell).

The E-UTRAN 10 corresponds to a radio access network. The E-UTRAN 10 includes an evolved Node-B (eNB) 200. The eNB 200 corresponds to a base station. The eNBs 200 are connected to each other via an X2 interface.

The eNB 200 manages one or more cells and performs radio communication with the UE 100 that has established connection to the cell. The eNB 200 has a radio resource management (RRM) function, a user data (hereinafter, simply referred to as "data") routing function, a measurement control function for mobility control and scheduling, and the like. The "cell" is used as the term indicating the smallest unit of the radio communication area and is also used as the term indicating the function of performing radio communication with the UE 100.

The EPC 20 corresponds to a core network. The EPC 20 includes a mobility management entity (MME)/serving-gateway (S-GW) 300. The MME performs various types of mobility control or the like on the UE 100. The S-GW performs data transfer control. The MME/S-GW 300 is connected to the eNB 200 via an S1 interface.

Figure 2:
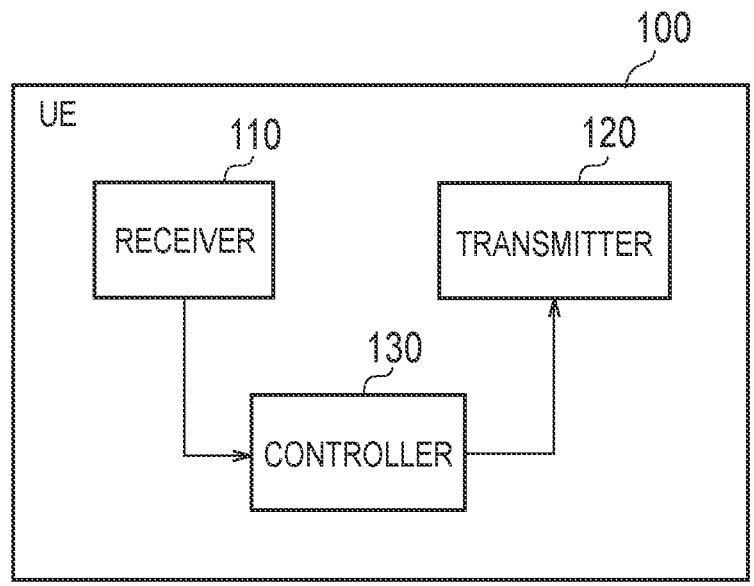
FIG. 2 is a diagram illustrating an architecture of a UE (radio terminal) according to an embodiment.

FIG. 2 is a diagram illustrating the architecture of the UE 100 (radio terminal). As illustrated in FIG. 2, the UE 100 includes a receiver 110, a transmitter 120, and a controller 130.

The receiver 110 performs a variety of reception under the control of the controller 130. The receiver 110 includes an antenna and a receiver. The receiver converts a radio signal received by the antenna into a baseband signal (reception signal) and outputs the baseband signal to the controller 130.

The transmitter 120 performs a variety of transmission under the control of the controller 130. The transmitter 120 includes an antenna and a transmitter. The transmitter converts a baseband signal (transmission signal) output by the controller 130 into a radio signal and transmits the radio signal from the antenna.

The controller 130 performs a variety of control on the UE 100. The controller 130 includes at least one processor and a memory. The memory stores a program executed by the processor and information used for processing by the processor. The processor includes a baseband processor that performs modulation and demodulation, coding and decoding, and the like of the baseband signal, and a central processing unit (CPU) that performs a variety of processes by executing a program stored in the memory. The processor performs a process to be described later.

Figure 3:
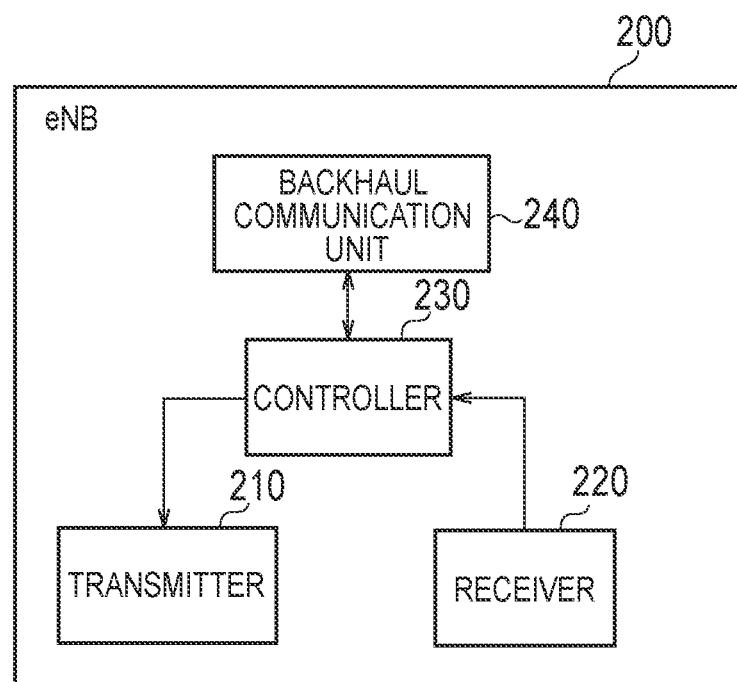
FIG. 3 is a diagram illustrating an architecture of an eNB (base station) according to an embodiment.

FIG. 3 is a diagram illustrating the architecture of the eNB 200 (base station). As illustrated in FIG. 3, the eNB 200 includes a transmitter 210, a receiver 220, a controller 230, and a backhaul communication unit 240.

The transmitter 210 performs a variety of transmission under the control of the controller 230. The transmitter 210 includes an antenna and a transmitter. The transmitter converts a baseband signal (transmission signal) output by the controller 230 into a radio signal and transmits the radio signal from the antenna.

The receiver 220 performs a variety of reception under the control of the controller 230. The receiver 220 includes an antenna and a receiver. The receiver converts a radio signal received by the antenna into a baseband signal (reception signal) and outputs the baseband signal to the controller 230.

The controller 230 performs a variety of control on the eNB 200. The controller 230 includes at least one processor and a memory. The memory stores a program executed by the processor and information used for processing by the processor. The processor includes a baseband processor that performs modulation and demodulation, coding and decoding, and the like of the baseband signal, and a central processing unit (CPU) that performs a variety of processes by executing a program stored in the memory. The processor performs a process to be described later.

The backhaul communication unit 240 is connected to the neighbour eNB 200 via an X2 interface and connected to the MME/S-GW 300 via an S1 interface. The backhaul communication unit 240 is used for communication performed on the X2 interface, communication performed on the S1 interface, and the like.

Figure 4:
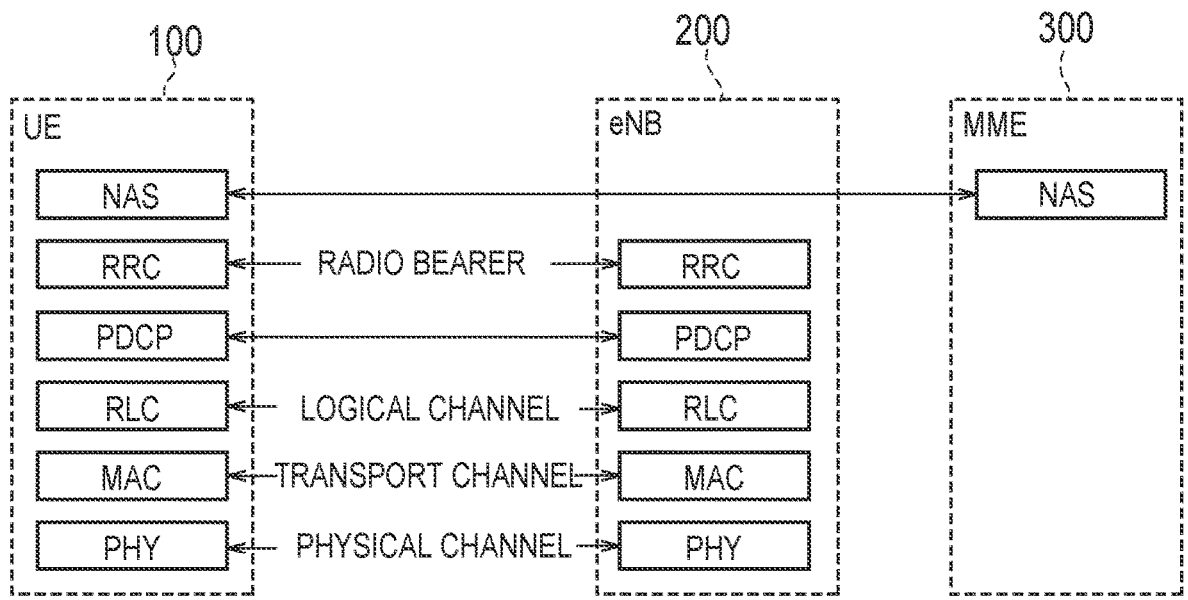
FIG. 4 is a diagram showing an architecture of a protocol stack of a radio interface according to an embodiment.

FIG. 4 is a diagram illustrating the architecture of the protocol stack of the radio interface in the LTE system. As illustrated in FIG. 4, a radio interface protocol is divided into a first layer to a third layer of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control information are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control information are transmitted between the MAC layer of the UE 100 and the MAC layer of the eNB 200 via a transport channel. The MAC layer of the eNB 200 includes a scheduler that determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control information are transmitted between the RLC layer of the UE 100 and the RLC layer of the eNB 200 via a logical channel.

The PDCP layer performs header compression and decompression, and encryption and decryption.

The RRC layer is defined only in a control plane that handles the control information. A message (RRC message) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected state; otherwise, the UE 100 is in an RRC idle state.

A non-access stratum (NAS) layer, which is located above the RRC layer, performs session management, mobility management, and the like.

Figure 5:
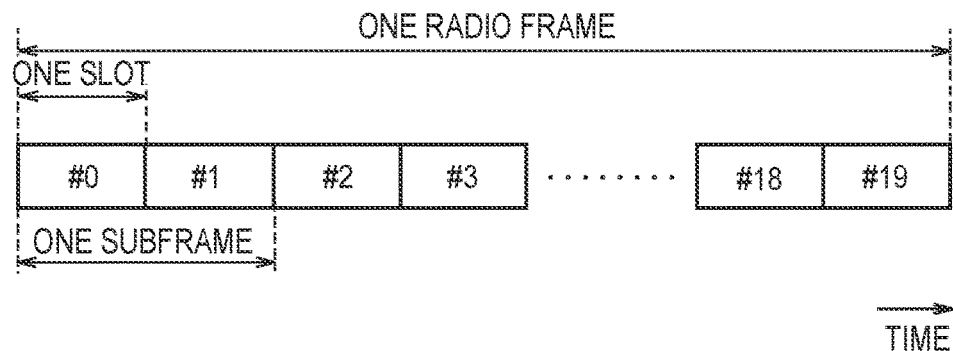
FIG. 5 is a diagram illustrating an architecture of a radio frame according to an embodiment.

FIG. 5 is a diagram illustrating the architecture of the radio frame used in the LTE system. As illustrated in FIG. 5, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in the time direction. Each resource block includes a plurality of subcarriers in the frequency direction. One symbol and one subcarrier constitute one resource element (RE). In addition, among the radio resources (time and frequency resources) allocated to the UE 100, the frequency resource can be specified by the resource block and the time resource can be specified by the subframe (or slot).

In the downlink, a section of several symbols in the head of each subframe is a region that is mainly used as a physical downlink control channel (PDCCH) for transmitting downlink control information. In addition, the remaining portion of each subframe is a region that is mainly used as a physical downlink shared channel (PDSCH) for transmitting downlink data. Basically, the eNB 200 transmits downlink control information (DCI) to the UE 100 by using the PDCCH and transmits downlink data to the UE 100 by using the PDSCH. The downlink control information carried by the PDCCH includes uplink scheduling information, downlink scheduling information, and a TPC command. The uplink scheduling information is scheduling information (UL grant) about allocation of uplink radio resources, and the downlink scheduling information is scheduling information about allocation of downlink radio resources. The TPC command is information instructing increase or decrease of uplink transmission power. The eNB 200 includes a CRC bit scrambled with an identifier (RNTI: radio network temporary ID) of the destination UE 100 in the downlink control information so as to identify the UE 100 that is the transmission destination of the downlink control information. Each UE 100 performs blind decoding on the PDCCH by performing CRC check after descrambling with the RNTI of the UE in the downlink control information that may be addressed to the UE, and detects the downlink control information addressed to the UE. The PDSCH carries downlink data by the downlink radio resource (resource block) indicated by the downlink scheduling information.

In the uplink, both end portions in the frequency direction in each subframe is a region that is mainly used as a physical uplink control channel (PUCCH) for transmitting uplink control information. The remaining portion of each subframe is a region that is mainly used as a physical uplink shared channel (PUSCH) for transmitting uplink data.

(Specific State)

Hereinafter, a specific state according to the first embodiment will be described.

The specific state is a state in which signaling is reduced as compared with the RRC connected state while context information (UE context) of the UE 100 is maintained in the network. The UE context includes information about various configurations and capabilities for the UE 100. The various configurations include a configuration of access stratum (AS). The specific state includes a light connected state and a suspend state. It should be noted that the light connected state may be referred to as a light connection state. In addition, the light connected (light connection) state may be referred to as a light connected (light connection) mode, and the suspend state may be referred to as a suspend mode.

The light connected state is a special RRC connected state in which signaling is reduced as compared with the RRC connected state. For example, the UE 100 in the light connected state is exempt from transmitting and receiving specific signaling with the network. Alternatively, the UE 100 in the light connected state reduces the frequency of transmitting and receiving specific signaling with the network. In addition, the light connected state may be a state in which the S1 connection to the UE 100 is maintained, or may be a state in which the RRC connection is released.

The suspend state is a special RRC idle state in which at least part of the UE context is maintained in the network. It should be noted that in the case of the general RRC idle state, the UE context is discarded in the network. The eNB 200 allocates a predetermined identifier (resume ID) when the UE 100 transitions to the suspend state. The UE 100 notifies the eNB 200 of the predetermined identifier when the UE 100 transitions from the suspend state to the RRC connected state. The eNB 200 resumes the use of the UE context based on the predetermined identifier. If the UE 100 moves in the suspend state, the eNB 200 may acquire the UE context from another eNB 200 connected via the X2 interface. The suspend state is an RRC idle state and may be defined as a state in which the connection configuration or the like is held. Alternatively, the suspend state may be defined as an RRC suspend state that is different from the RRC idle state and the RRC connected state.

The UE 100 can make a transition (that is, RRC connection setup) from the specific state to the RRC connected state with less signaling by using the maintained UE context.

(Predetermined Area According to First embodiment)

Hereinafter, the predetermined area according to the first embodiment will be described. The mobile communication system according to the first embodiment introduces a new area unit that is different from a cell and a tracking area. In the following, an area of such an area unit is referred to as a "predetermined area". The predetermined area is applied to the UE 100 in the specific state (a light connected state or a suspend state).

The predetermined area is formed by a group of cells or eNBs 200. The predetermined area according to the first embodiment is an area in which the network simultaneously performs paging transmission. The predetermined area is an area unit of a limited range as compared with the tracking area. For example, the predetermined area is an area of a part of the tracking area. The predetermined area may be set within the same tracking area, or may be set across a different tracking area.

By performing paging only in such a narrow area, it is possible to reduce the number of cells that perform paging transmission as compared with the case of performing paging in units of tracking areas. Therefore, it is possible to reduce signaling (paging). It should be noted that the paging transmission in the predetermined area unit may be performed not on the initiative of the MME 300 (MME initiated) but on the initiative of the eNB 200 (eNB initiated). Such paging may be referred to as RAN-based paging.

(Operation According to First Embodiment)

In response to recognizing the movement of the UE 100 outside the predetermined area formed by the group provided with the cells or eNBs 200, the UE 100 according to the first embodiment transmits a notification indicating the movement to the network. The predetermined area is an area unit of a limited range rather than the tracking area. In the first embodiment, the predetermined area is applied while the UE 100 is in the specific state. In other words, the UE 100 enables the transmission of the notification indicating the movement only while the UE 100 is in the specific state. Therefore, the network (in particular, the MME 300) can grasp the predetermined area in which the UE 100 in the specific state exists and can appropriately perform the paging with respect to the predetermined area in which the UE 100 exists.

In the first embodiment, the UE 100 receives information indicating the predetermined area from the network (the eNB 200 or the MME 300), and recognizes the movement to the outside of the predetermined area based on the received information. The information includes at least one of an identifier (group ID) of the group forming the predetermined area, an identifier list (cell ID list) of the cells included in the group, and an identifier list (eNB ID list) of the eNBs 200 included in the group.

Figure 6:
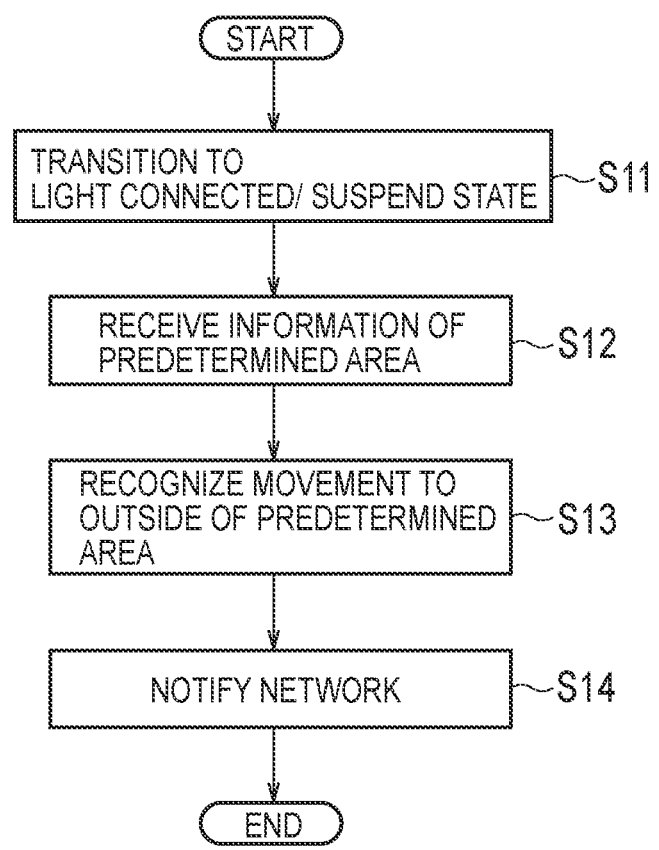
FIG. 6 is a diagram illustrating an operation of a UE according to a first embodiment.

FIG. 6 is a diagram illustrating the operation of the UE 100 according to the first embodiment.

As illustrated in FIG. 6, in step S11, the UE 100 receives, from the eNB 200, an instruction (configuration information) to transition the UE 100 to the specific state. For example, the eNB 200 transmits, to the UE 100, the instruction (configuration information) to transition to the specific state by using the UE-dedicated RRC signaling. The UE-dedicated RRC signaling may be an RRC connection release. As a result, the UE 100 transitions from the RRC connected state to the specific state.

In step S12, the UE 100 receives the information indicating the predetermined area from the network. Step S12 may be performed at the same time as step S11. There are a pattern in which the eNB 200 transmits the information indicating the predetermined area and a pattern in which the MME 300 transmits the information indicating the predetermined area.

In the pattern in which the eNB 200 transmits the information indicating the predetermined area, the eNB 200 transmits, to the UE 100, at least one of the group ID to which the eNB 200 (cell) belongs, the cell ID list of the cells included in the group, and the eNB ID list of the eNBs 200 included in the group by broadcast RRC signaling (for example, SIB) or UE-dedicated RRC signaling (for example, RRC connection release). The eNB 200 may receive the group ID, the cell ID list, and the eNB ID list from the MME 300 through an MME configuration update or the like.

In the pattern in which the MME 300 transmits the information indicating the predetermined area, the MME 300 transmits, to the UE 100, the cell ID list of the cells included in the group and the eNB ID list of the eNBs 200 included in the group by NAS signaling.

In step S13, the UE 100 recognizes the movement to the outside of the predetermined area notified from the network based on the information indicating the predetermined area. It should be noted that "movement to the outside of the predetermined area" may be a movement to a cell or an eNB 200 not included in the predetermined area (group) notified from the network. Alternatively, "movement to the outside of the predetermined area" may be a movement from one predetermined area to another predetermined area.

If the cell ID list or the eNB ID list is notified, the UE 100 determines whether the cell (or the eNB 200) in which the UE 100 exists is included in the list. If the cell (or the eNB 200) in which the UE 100 exists is not included in the list, the UE 100 recognizes that the UE 100 has moved to the outside of the predetermined area. Otherwise, the UE 100 recognizes that the UE 100 is within the predetermined area.

If the group ID is notified from the eNB 200, when the UE 100 moves from one cell (or one eNB) to another cell (or another eNB), the UE 100 determines whether the group ID notified from the one cell (or the one eNB) is the same as the group ID notified from the another cell (or the another eNB). In the case of different group IDs, the UE 100 recognizes that the UE 100 has moved to the outside of the predetermined area. Otherwise, the UE 100 recognizes that the UE 100 is within the predetermined area.

When the UE 100 recognizes that the UE 100 has moved to the outside of the predetermined area, the UE 100 transmits a notification indicating the movement to the network in step S14. The notification indicating the movement may include at least one of the group ID, the cell ID, and the eNB ID. These IDs are a movement source ID and/or a movement destination ID. There are a pattern in which the notification indicating the movement is transmitted to the MME 300 and a pattern in which the notification indicating the movement is transmitted to the eNB 200.

In the pattern in which the notification indicating the movement is transmitted to the MME 300, the UE 100 transmits the notification to the MME 300 by NAS signaling (NAS message). Based on the notification, the MME 300 determines a cell (or eNB 200) to be a transmission destination of the paging of the UE 100. It should be noted that the eNB 200 may decode the NAS message, may read the information of the UE 100 (the ID of the UE 100 in the cell), and may store the information.

In the pattern in which the notification indicating the movement is transmitted to the eNB 200, the UE 100 transmits the notification to the eNB 200 by RRC signaling (or MAC control element). The eNB 200 may forward the received notification to the MME 300. At that time, the eNB 200 may further notify the MME 300 of the cell ID (or the group ID or the like).

In the pattern in which the notification indicating the movement is transmitted to the eNB 200, the UE 100 transmits the notification to the eNB 200 (cell) of the movement source or the eNB 200 (cell) of the movement destination. If the notification is transmitted to the eNB 200 (cell) of the movement source, the UE 100 notifies the cell (eNB 200) belonging to the predetermined area before leaving the predetermined area. The notification may include the cell ID (and/or the eNB ID, the group ID) of the movement destination cell. The eNB 200 may transmit the UE context of the UE 100 to the cell belonging to the new area. If the notification is transmitted to the eNB 200 (cell) of the movement destination, the UE 100 notifies the (new) cell (eNB 200) not belonging to the predetermined area after leaving the predetermined area. The notification may include the cell ID (and/or the eNB ID, the group ID) of the movement source cell. The eNB 200 may make a request for the UE 100 context to the movement source cell (movement source eNB).

In the pattern in which the notification indicating the movement is transmitted to the eNB 200, the UE 100 may perform notification after establishing the RRC connection, or may perform notification without establishing the RRC connection.

In the pattern in which the notification is performed without establishing the RRC connection, the UE 100 in the light connected state transmits the notification along the scheme of the light connected state if uplink synchronization is established (that is, if timing advance can be acquired). On the other hand, if the uplink synchronization is not established (that is, if the timing advance cannot be acquired), a random access procedure may be performed and the notification may be performed during the random access procedure.

In the pattern in which the notification is performed without establishing the RRC connection, the UE 100 in the suspend state may perform the random access procedure and perform the notification during the random access procedure.

Here, the operation of performing the notification during the random access procedure will be described. The UE 100 transmits a random access preamble (Msg1) to the eNB 200 and receives a random access response (Msg2) from the eNB 200. Next, the UE 100 performs the notification to the eNB 200 instead of transmitting an RRC connection request or an RRC connection reestablishment request in Msg3, or in these messages. The notification includes the identifier of the UE 100 (IMSI, S-TMSI, resume ID, or the like). Then, the random access procedure in Msg4 is terminated without establishing the RRC connection. That is, the eNB 200 does not transmit the RRC connection setup. It may be notified as an information element of RRC connection request and RRC connection reestablishment.

Modification 1 of First Embodiment

In the first embodiment, the cell (or the eNB 200) to which the UE 100 transmits the notification may be limited. For example, the eNB 200 transmits an identifier (permission information) indicating whether the UE 100 is allowed to perform the notification by broadcast RRC signaling (SIB). The UE 100 transmits the notification only to the cell (or the eNB 200) that transmits the permission information.

Modification 2 of First Embodiment

In the above-described first embodiment, an example in which the UE 100 in the light connected state performs the random access procedure if the uplink synchronization is not established (that is, if the timing advance cannot be acquired) has been described. The UE 100 can establish the uplink synchronization by performing the random access procedure. In this manner, the UE 100 in the light connected state can maintain downlink synchronization, but cannot always maintain the uplink synchronization. It should be noted that the UE 100 determines that the uplink is asynchronous when a time alignment timer (TAT) expires.

In the general LTE system, the UE 100 that is not synchronized with the uplink (for example, the UE 100 in the RRC idle state) starts the random access procedure in response to generation of uplink data. On the other hand, it is preferable that the light connected state can return to the RRC connected state more quickly. In addition, if the UE 100 receives downlink data, there is a high possibility that uplink transmission (for example, ACK/NACK transmission) will occur after that.

According to modification 2 of the first embodiment, if the UE 100 is in the light connected stat, the UE 100 starts the random access procedure for the eNB 200 in response to the UE's reception of the downlink data from the eNB 200. Here, the UE 100 starts the random access procedure in response to the reception of the downlink data even before the uplink data is generated. In this manner, it is possible to return to the connected state more quickly by starting the random access procedure even before the uplink data is generated.

Figure 7:
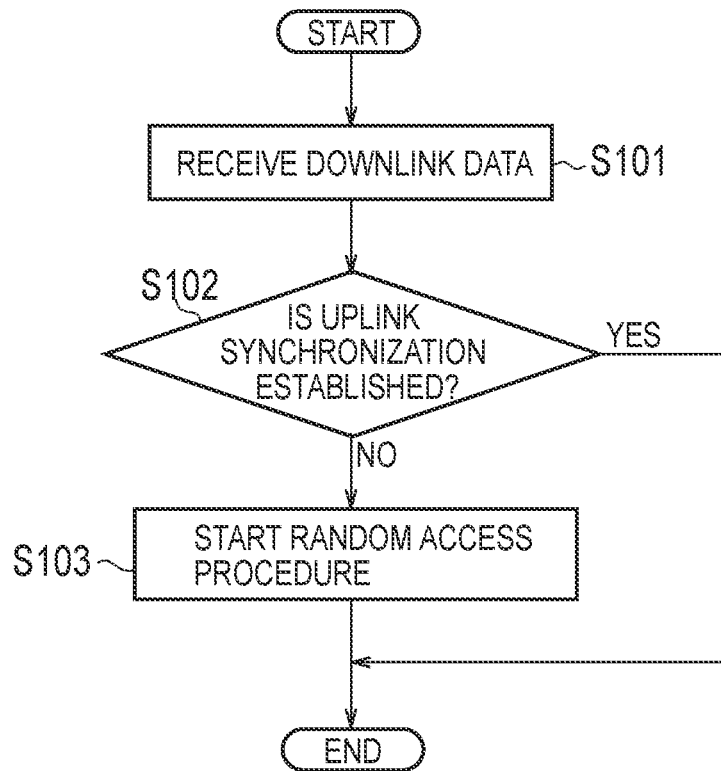
FIG. 7 is a diagram illustrating an operation of a UE in a light connected state according to modification 2 of the first embodiment.

FIG. 7 is a diagram illustrating the operation of the UE 100 in the light connected state according to modification 2 of the first embodiment. As illustrated in FIG. 7, in step S101, the UE 100 in the light connected state receives downlink data from the eNB 200. In step S102, the UE 100 checks whether uplink synchronization is established. If the uplink synchronization is not established (step S102: NO), the UE 100 starts the random access procedure in step S103. As a result, the UE 100 transitions to the connected state.

Second Embodiment

In the second embodiment, differences from the first embodiment will be mainly described below.

A predetermined area according to the second embodiment will be described. The predetermined area is formed by a group of cells or eNBs 200. The predetermined area according to the second embodiment is applied to the UE 100 in a specific state (a light connected state or a suspend state). In addition, the predetermined area according to the second embodiment is an area unit in which the network can maintain context information. The predetermined area may be formed by a plurality of eNBs 200 mutually connected via an X2 interface.

Even if the UE 100 that has transitioned to the specific state within the predetermined area moves to another cell (other eNB 200) within the predetermined area, the UE 100 can perform the RRC connection setup with less signaling. On the other hand, when the UE 100 that has transitioned to the specific state within the predetermined area moves to the outside of the predetermined area, the UE context is not maintained, and it is necessary to newly create the UE context. Therefore, continuing the specific state is not appropriate.

The eNB 200 according to the second embodiment may transition the UE 100 to the specific state and may transmit the context information of the UE 100 to another eNB that forms the predetermined area together with the eNB 200 (that is, another eNB in the same group as the eNB 200). As described above, the eNB 200 according to the second embodiment assumes that the UE 100 moves to the outside of the cell (the eNB 200) and previously shares the context information with another eNB. Therefore, when the UE 100 performs the RRC connection setup, it is possible to reduce the time for acquiring the UE context between the eNBs, and thus the RRC connection setup can be promptly performed.

In addition, a first operation or a second operation for avoiding continuing to hold the UE context permanently in the eNB may be added.

In the first operation, if the (own/another) eNB performs the RRC connection with the UE 100 (for example, if the RRC connection is resumed), information (for example, UE context release) indicating that the pre-shared UE context can be discarded may be notified to another eNBs in the same group. The discardable information may include information (for example, resume ID and UE X2AP ID) for specifying the UE context. The eNB that has received the discardable information may discard the corresponding UE context.

In the second operation, when the eNB 200 transmits the UE context to another eNB, the eNB 200 may further transmit information (timer value, time, or the like) indicating the validity period of the UE context. The eNB that has received the UE context may discard the UE context in response to the expiration of the validity period.

According to the second embodiment, if the UE 100 is in the specific state, the UE 100 stops the specific state in response to recognizing the movement of the UE 100 to the outside of the predetermined area. In other words, the UE 100 validates the specific state only within the predetermined area. In this case, the UE 100 may transition from the specific state to the RRC connected state, or may transition from the specific state to the RRC idle state. If the UE 100 transitions from the specific state to the RRC connected state, the UE 100 may transmit the RRC connection request to the eNB 200. In addition, the UE 100 may discard the configuration related to the specific state. Therefore, occurrence of an unexpected error can be prevented even if moving to the outside of the predetermined area.

Figure 8:
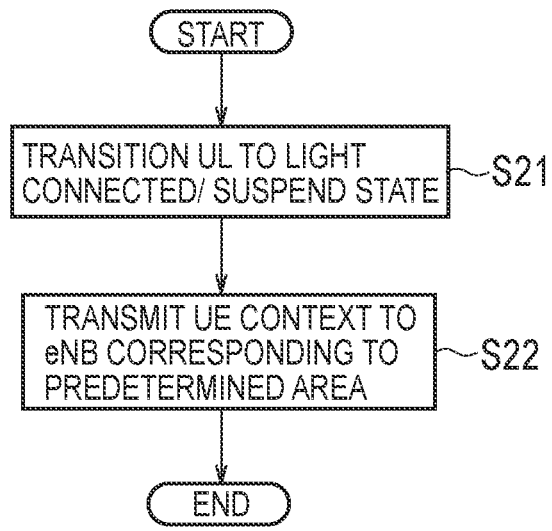
FIG. 8 is a diagram illustrating an operation of an eNB according to a second embodiment.

FIG. 8 is a diagram illustrating the operation of the eNB 200 according to the second embodiment. As illustrated in FIG. 8, in step S21, the eNB 200 transitions the UE 100 to the specific state. For example, the eNB 200 transmits, to the UE 100, the instruction (configuration information) to transition to the specific state by using the UE-dedicated RRC signaling. The UE-dedicated RRC signaling may be an RRC connection release. As a result, the UE 100 transitions from the RRC connected state to the specific state. In step S22, the eNB 200 transmits the UE context of the UE 100 to another eNB in the same group as the eNB 200. For example, the eNB 200 transmits the UE context on the X2 interface. The eNB 200 may transmit the UE context to all the eNBs (except for the eNB 200) in the same group as the eNB 200. The another eNB that has received the UE context stores the received UE context and uses the UE context when the UE 100 moves to the eNB.

Figure 9:
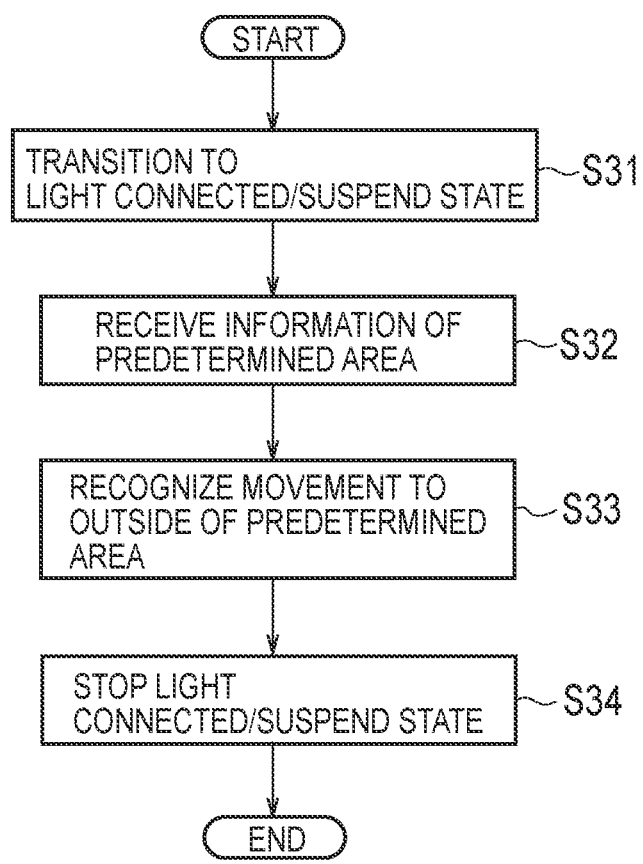
FIG. 9 is a diagram illustrating an operation of a UE according to the second embodiment.

FIG. 9 is a diagram illustrating the operation of the UE 100 according to the second embodiment. As illustrated in FIG. 9, the operations of steps S31 to S33 are the same as those of the first embodiment. When the movement of the UE 100 to the outside of the predetermined area at the time of the transition to the specific state is recognized, the UE 100 stops the specific state in step S34.

Modification 1 of Second Embodiment

In the above-described second embodiment, an example in which the eNB 200 performs the configuration of the light connected state (the instruction to transition from the RRC connected state to the light connected state) individually for the UE has been described. That is, the UE 100 receives the configuration of the specific state from the eNB 200 by dedicated signaling, and transitions from the RRC connected state to the specific state in response to the reception of the configuration.

In addition, in the above-described second embodiment, the UE 100 discards the configuration when the UE 100 transitions from the light connected state to the RRC connected state. That is, the UE 100 discards the configuration in response to the transition from the specific state to the RRC connected state.

If the configuration for the light connected state remains when returning to the RRC connected state, it is unclear whether the UE 100 transitions to the light connected state or transitions to the RRC idle state when the UE 100 makes a state transition from the RRC connected state. In particular, if the transition to the light connected state is made by the RRC connection release, such a problem becomes conspicuous. Therefore, the problem can be avoided by discarding the configuration.

Figure 10:
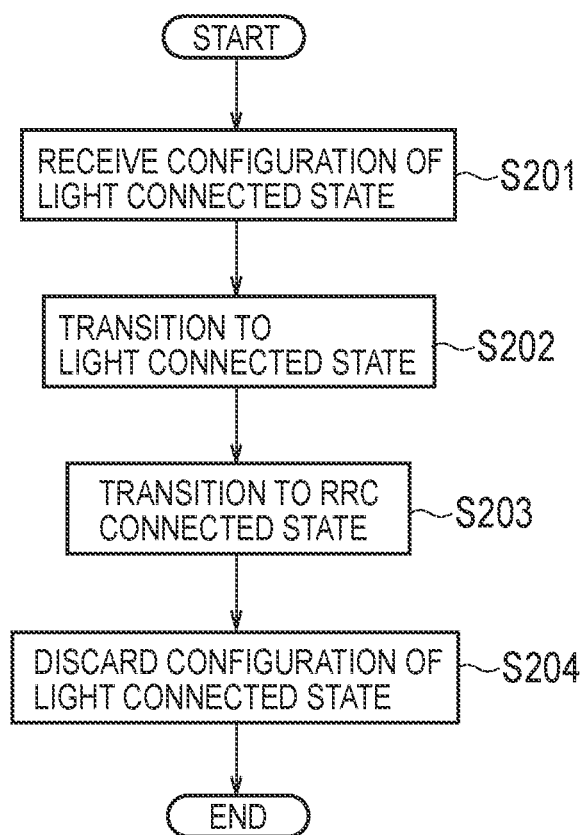
FIG. 10 is a diagram illustrating an operation of a UE according to modification 1 of the second embodiment.

In modification 1 of the second embodiment, such an operation will be described in more detail. FIG. 10 is a diagram illustrating the operation of the UE 100 according to modification 1 of the second embodiment.

As illustrated in FIG. 10, in step S201, the UE 100 receives the configuration of the light connected state from the eNB 200 by UE-dedicated signaling. Here, an RRC connection release or RRC connection reconfiguration message is assumed as the UE-dedicated signaling.

The configuration of the light connected state may include an identifier instructing to transition to the light connected state. For example, the eNB 200 includes an information element (IE) such as "light connected setup" in the RRC connection release or RRC connection reconfiguration message.

Alternatively, the transition to the light connected state may be implicitly instructed by including the following configuration in the RRC connection release or RRC connection reconfiguration message.

- DRX configuration for light connected state. Such a DRX configuration will be described in a fourth embodiment.
- Timer value related to state transition. The UE 100 starts the timer when the transition to the light connected state is instructed, and maintains the light connected state while the timer is in operation. Then, the UE 100 transitions to the RRC connected state in response to the expiration of the timer.
- Cell list. The configuration information corresponds to the "information indicating the predetermined area" described in the first embodiment.

In step S202, the UE 100 transitions from the RRC connected state to the light connected state according to the configuration for the light connected state.

In step S203, the UE 100 transitions to the RRC connected state again in response to satisfaction of the condition for the transition to the RRC connected state in the light connected state.

In step S204, the UE 100 discards the configuration for the light connected state.

Modification 2 of Second Embodiment

In the above-described second embodiment, the UE 100 transitions to the RRC connected state or the RRC idle state in response to stopping the light connected state (specific state). Here, it has been assumed that whether to transition to the RRC connected state or transition to the RRC idle state is entrusted or predefined to the autonomous determination of the UE 100.

In modification 2 of the second embodiment, the eNB 200 can configure whether to transition to the RRC connected state or transition to the RRC idle state. Therefore, the behavior of the UE 100 can be controlled by the eNB 200.

According to modification 2 of the second embodiment, if the UE 100 is in the light connected state, the UE 100 stops the specific state in response to satisfaction of a predetermined condition. The predetermined condition may be that the timer related to the state transition has expired, or may be that the UE 100 has left the predetermined area.

The UE 100 receives, from the eNB 200, information for configuring the operation of the UE 100 when the light connected state is stopped. When the light connected state is stopped, the UE 100 performs the operation configured from the eNB 200.

Figure 11:
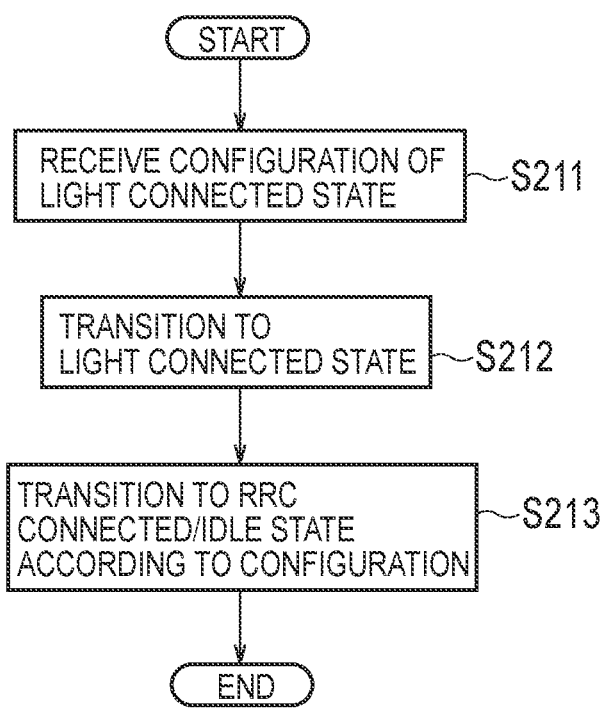
FIG. 11 is a diagram illustrating an operation of a UE according to modification 2 of the second embodiment.

FIG. 11 is a diagram illustrating the operation of the UE 100 according to modification 2 of the second embodiment.

As illustrated in FIG. 11, in step S211, the UE 100 receives the configuration of the light connected state from the eNB 200. The configuration of the light connected state is included in, for example, the RRC connection release message. The configuration of the light connected state includes an indicator specifying whether to transition to the RRC connected state or transition to the RRC idle state after the light connected state.

In step S212, the UE 100 transitions to the light connected state.

In step S213, the UE 100 transitions to the RRC connected state or the RRC idle state according to the configuration from the eNB 200.

Third Embodiment

In the third embodiment, differences from the first and second embodiments will be described below. In the third embodiment, the light connected state is mainly assumed as the specific state.

According to the third embodiment, if the UE 100 is in the specific state (light connected state), the eNB 200 transmits downlink data to the UE 100 without transmitting a paging message to the UE 100. In other words, the eNB 200 according to the third embodiment performs downlink transmission without performing paging to the UE 100 in the specific state (light connected state). In addition, according to the third embodiment, if the UE 100 is in the specific state (light connected state), the UE 100 receives the downlink data from the eNB 200 without receiving the paging message from the eNB 200. Therefore, according to the third embodiment, it is possible to reduce signaling (paging) with respect to the UE 100 in the light connected state.

In the third embodiment, in order to receive the downlink data, the UE 100 in the light connected state monitors the PDCCH at the same timing as the operation in the RRC connected state. For example, the UE 100 monitors the PDCCH at the on timing (on duration) of DRX (discontinuous reception) in the RRC connected state. If there is PDSCH allocation in the PDCCH, the UE 100 receives the downlink data by the PDSCH.

The eNB 200 receives the downlink data for the UE 100 from the S-GW 300, performs PDCCH transmission to the UE 100 at the timing when the UE 100 monitors the PDCCH, and transmits the downlink data to the UE 100 through the PDSCH. At this time, the eNB 200 does not transmit the paging message to the UE 100.

The MME 300 recognizes the UE 100 in the light connected state as an ECM connected state and does not transmit, to the eNB 200, the S1 paging message corresponding to the UE 100.

Modification 1 of Third Embodiment

The eNB 200 according to modification 1 of the third embodiment transmits downlink data to the UE 100 in the light connected state by multi-cell transmission that simultaneously performs transmission from a plurality of cells including the cell. Here, the eNB 200 transmits the downlink data to the UE 100 without transmitting the paging message to the UE 100.

In this manner, since the downlink data is transmitted in units of areas (predetermined areas) including the plurality of cells, the network does not need to grasp the cell in which the UE 100 exists. Therefore, the UE 100 does not transmit position information to the network whenever the UE 100 moves the cell, and may notify the network when moving the predetermined area. It should be noted that the multi-cell transmission may be performed only within the area (predetermined area) in which the UE 100 can move transparently to the eNB 200.

FIG. 12 is a diagram illustrating the operation according to modification 1 of the third embodiment. FIG. 12 illustrates an example in which a predetermined area #1 is formed by a plurality of cells (cells #1, #2, . . . ) and the respective cells are managed by different eNBs 200. However, one eNB 200 may manage a plurality of cells. The UE 100 in the light connected state exists in the cell #2 in the predetermined area #1. It should be noted that the network grasps that the UE 100 exists in the predetermined area #1, but does not grasp that the UE 100 exists in the cell #2.

As illustrated in FIG. 12, in step S301, the EPC 20 (S-GW) transmits, to the eNB 200-1, downlink data (DL data 1) destined for the UE 100.

In step S302, the eNB 200-1 forwards, to the eNB 200-2, at least a part (DL data 2) of the DL data 1 received from the EPC 20 (S-GW). The DL data 2 may be the same amount of data as a normal paging message (that is, a small amount of data). In addition, the eNB 200-1 and the eNB 200-2 may share the configuration for multi-cell transmission. The configuration may include the C-RNTI of the UE 100, or may include the resume ID of the UE 100.

Instead of forwarding the DL data 2 between the eNBs 200, the EPC 20 (S-GW) may multicast the DL data 2 to all the eNBs 200 in the predetermined area #1.

In step S303, the eNB 200-1 and the eNB 200-2 transmit the DL data 2 by using the multi-cell transmission by the cell #1 and the cell #2. The eNB 200-1 and the eNB 200-2 may use the C-RNTI or the resume ID as the destination ID of the DL data 2. If the resume ID is used, scramble of PDCCH may be performed by resume ID, or PDSCH transmission may be performed without PDCCH. The transmission resource of the DL data 2 (that is, the PDSCH resource) may be the narrowband resource described in the fourth embodiment. The transmission MCS of the DL data 2 may be a fixed value, or may be designated in the configuration of the light connected state.

In step S304, the UE 100 that has received the DL data 2 transmits an ACK corresponding to the DL data 2 to the cell #2 that is a serving cell. As described above, if the uplink synchronization is not established, the UE 100 may perform the random access procedure. The UE 100 may transmit the ACK to the cell #2 in the random access procedure. For example, the UE 100 includes the ACK in the random access procedure Msg1 (random access preamble) or Msg3 (RRC connection request message).

In step S305, the eNB 200-2 (cell #2) that has received the ACK from the UE 100 determines that the UE 100 exists in the cell (cell #2). In other words, the network handles the ACK as the paging response.

On the other hand, in step S306, the eNB 200-1 (cell #1) that does not receive the ACK from the UE 100 determines that the UE 100 does not exist in the cell (cell #1).

It should be noted that it is preferable that the time period during which each eNB 200 waits for ACK is a time length with allowance to some extent in consideration of the possibility that the UE 100 performs the random access procedure.

In the operation of FIG. 12, the eNB 200-1 determines that the UE 100 does not exist in the cell (cell #1) in response to not receiving the ACK from the UE 100 within the waiting time of the ACK. However, instead of such a method, notification may be performed from the eNB 200-2 to the eNB 200-1, and the eNB 200-2 may perform the determination based on the notification. For example, the eNB 200-2 notifies the EPC 20 that the ACK has been received. Further, the EPC 20 notifies another eNB 200 (eNB 200-1) in the predetermined area #1. Alternatively, the eNB 200-2 may directly notify another eNB 200 (eNB 200-1) in the predetermined area #1, in addition to such notification via the EPC 20.

Modification 2 of Third Embodiment

In the above-described third embodiment and modification 1 thereof, the eNB 200 transmits the downlink data to the UE 100 in the light connected state without transmitting the paging message. On the other hand, as described in the first embodiment, there may be an option of performing RAN-based paging that is paging performed on the initiative of the eNB 200 (eNB initiated).

The eNB 200 according to the third embodiment notifies the UE 100 of information indicating which of the first paging mode and the second paging mode is to be applied. The first paging mode is a mode of transmitting the downlink data without transmitting the paging message (see the third embodiment). The second paging method is a mode (that is, RAN-based paging) in which the downlink data is transmitted after transmitting the paging message on the initiative of the eNB 200. The UE 100 applies the first paging mode or the second paging mode according to the configuration from the eNB 200. The configuration may be notified by broadcast signaling (SIB) or UE-dedicated signaling (dedicated signaling). The eNB 200 may determine which of the first paging mode and the second paging mode is to be applied based on the type of the cell (for example, macro/small) and the moving state (for example, speed or the like) of the UE 100.

Fourth Embodiment

In the fourth embodiment, differences from the first to third embodiments will be described below. The fourth embodiment is an embodiment related to intermittent reception (DRX) for the light connected state.

The UE 100 according to the fourth embodiment performs not only intermittent reception on the time axis but also intermittent reception in the frequency direction (that is, narrowband reception) as the DRX applied at the time of light connected. The narrowband reception means to monitor frequencies in the range narrower than the range of frequencies to be monitored by the existing DRX. In the existing DRX, the UE 100 monitors the entire system bandwidth (the bandwidth of each cell) for all the active cells (primary cell and at least one secondary cell) used by the UE 100. On the other hand, in the DRX applied at the time of light connected, the UE 100 monitors only some of the active cells used by the UE 100 and/or monitors only a part of the system bandwidth.

The UE 100 according to the fourth embodiment performs a first intermittent reception (existing DRX) if the UE 100 is in the RRC connected state or the RRC idle state, and performs a second intermittent reception (DRX for the light connected state) if the UE 100 is in the specific state. The second intermittent reception is an intermittent reception in which the range of frequencies to be monitored is limited as compared with the first intermittent reception.

The operation and parameters of the DRX for the light connected state in the time axis direction are the same as those of the existing DRX.

On the other hand, the operation and parameters of the DRX for the light connected state in the frequency axis direction are parameters that are different from those of the existing DRX. The parameters of the DRX for the light connected state in the frequency axis direction may include information about the resource block (PRB: physical resource block). The resource block information includes at least one of a resource block number at the start/end positions of the frequency range to be monitored, and the number of resource blocks corresponding to the bandwidth of the frequency range to be monitored. The parameters of the DRX for the light connected state in the frequency axis direction may include a carrier number (ARFCN: absolute radio frequency channel number). The parameters of the DRX for the light connected state in the frequency axis direction are designated from the network (eNB 200) to the UE 100.

The UE 100 monitors the PDCCH in the set frequency domain in the set time interval. The UE 100 may receive the narrowband PDCCH (M-PDCCH). Such an operation may be performed only if the parameters of the DRX for the light connected state in the frequency axis direction are configured to the UE 100.

In this manner, since it is only necessary to monitor the frequency range narrower than in the conventional case by performing the narrowband reception in the DRX for the light connected state, the power consumption of the UE 100 can be reduced. In addition, since it is possible to allocate different frequency resources (carriers and/or resource blocks) for each UE 100, load distribution is expected.

It should be noted that the parameters of the DRX for the light connected state in the frequency axis direction may be shared by the cells (eNBs 200) within the predetermined area (see modification 1 of the third embodiment). The parameters may be shared in advance, or may be shared at the time of occurrence of communication (context fetch or the like).

Alternatively, the parameters of the DRX for the light connected state in the frequency axis direction may be invalid if the UE 100 leaves the cell after the UE 100 transitions to the light connected state in a certain cell. In this case, the UE 100 shifts to a full band monitor when the UE 100 transitions to another cell. The UE 100 may validate only the DRX in the time direction in the separate cell, or may invalidate the DRX in the time direction.

Fifth Embodiment

In the fifth embodiment, differences from the first to fourth embodiments will be described below.

The fifth embodiment is an embodiment that makes it possible to transition to the RRC idle state on the initiative of the UE 100 (UE initiated) in the light connected state. Therefore, the UE 100 can determine transition to the RRC idle state according to the situation of the UE 100 (for example, the situation of the application executed by the UE 100).

However, when the UE 100 freely permits transition to the RRC idle state, it is difficult for the network to grasp the state of the UE 100. Assuming that the light connected state is ECM-connected from the viewpoint of the core network (MME), it is preferable that the network can grasp the state of the UE 100.

If the UE 100 according to the fifth embodiment is in the light connected state, the UE 100 transmits, to the eNB 200, information notifying or requesting that the UE 100 transitions to the RRC idle state. In the case of using the request, the UE 100 may transition to the RRC idle state only when the UE 100 receives an acknowledgment from the eNB 200.

With such notification (or request), the network can grasp the state of the UE 100. Due to this, the network can determine whether to use MME initiated paging (paging for RRC idle state) or RAN-based paging (paging for light connected state) in the case of calling the UE 100.

FIG. 13 is a diagram illustrating the operation according to the fifth embodiment. In the initial state of FIG. 13, the UE 100 is in the light connected state.

As illustrated in FIG. 13, in step S501, the UE 100 determines whether to transition to the RRC idle state. For example, based on the state of the application layer or the like, the UE 100 determines to transition to the RRC idle state if the possibility of data communication disappears (for example, if the session of the upper layer is disconnected).

In step S502, the UE 100 transmits, to the eNB 200, information notifying or requesting that the UE 100 transitions to the RRC idle state. Here, it is assumed that the UE 100 transmits the notification by using Msg1 or Msg3 of the random access procedure.

If Msg1 is used, the random access preamble is transmitted by using a signal sequence associated with the identifier of the UE 100 (for example, resume ID, C-RNTI, S-TMSI, IMSI). The eNB 200 identifies the UE 100 from the sequence. Alternatively, the random access preamble is transmitted by using the radio resource (time/frequency resource) associated with the identifier of the UE 100. The eNB 200 identifies the UE 100 from the radio resource. The association information may be notified (informed) to the UE 100 in advance. The eNB 200 transmits Msg2 (random access response) to the UE 100 as the response to Msg1.

If Msg3 is used, the notification is stored in the RRC message (RRC connection request). The eNB 200 transmits Msg4 to the UE 100 as the response to Msg3.

In step S503, the eNB 200 may indicate, to the UE 100, whether to transition to the RRC idle state by Msg4 (OK or NG).

In the case of OK, the eNB 200 may transmit a connection establishment rejection message (RRC connection reject) to the UE 100 as Msg4. Therefore, the UE 100 stops the random access procedure and transitions to the RRC idle state without transitioning to the RRC connected state (step S504). Alternatively, the eNB 200 may notify the UE 100 of the transition to the RRC idle state through Msg2.

In this manner, since the UE 100 performs the notification in the course of the random access procedure without completing the random access procedure, it is possible to prevent the UE 100 from transitioning to the RRC connected state only for the notification. Therefore, signaling or the like can be reduced. It should be noted that the same operation can be performed in the detach request of the NAS, but if the detach request is used, the UE 100 must transition to the RRC connected state.

On the other hand, in the case of NG, the eNB 200 may cause the UE 100 to transition to the RRC connected state. The eNB 200 transmits a connection establishment permission message (RRC connection setup) to the UE 100 as Msg4, and the UE 100 transitions to the RRC connected state. Alternatively, the eNB 200 may notify the UE 100 of the rejection of the transition to the RRC idle state through Msg2.

In step S505, the eNB 200 may release the RRC connection (step S505) and transmit a UE context release request to the EPC 20 (MME) (step S506).

OTHER EMBODIMENTS

The specific state may be valid only during a period in which the timer configured to the UE 100 is in operation. In this case, the UE 100 stops the specific state in response to the expiration of the timer. Alternatively, the specific state may be valid only during a period in which the UE 100 is within a predetermined frequency. For example, the UE 100 that has received the instruction of the specific state (light connection) in a certain cell ends the specific state in response to the movement to a cell having a frequency different from a frequency to which the cell belongs.

In the above-described embodiment, an example in which the predetermined area is applied only to the UE 100 in the specific state has been described. However, the predetermined area can also be applied to the UE 100 in the idle state.

In the above-described embodiment, the UE 100 may make an RRC connection (request) in response to the fact that the UE 100 has moved to the outside of the predetermined area. In this case, after entering the RRC connected state, the UE 100 waits for an instruction or notification from the eNB 200 (for example, acquisition of new area information, transition to the specific state, or the like). It should be noted that the UE 100 may configure the cause (establishment cause) of the RRC connection request (RRC connection request) to a value indicating "leaving to the outside of the area".

The present disclosure is not limited to the case in which the above-described embodiments are separately and independently performed, but two or more embodiments may be performed in combination. For example, a part of configurations according to one embodiment may be added to other embodiments. Alternatively, a part of configurations according to one embodiment may be replaced with a part of configurations of other embodiments.

In the above-described embodiment, the LTE system has been exemplified as the mobile communication system. However, the present disclosure is not limited to the LTE system. The present disclosure may be applied to systems other than the LTE system. For example, the embodiment may be applied to the 5th generation communication system (5G system). In the 5G system, an inactive state (inactive mode) is being studied as a new RRC state, and the light connection state in the embodiment may be replaced with an inactive state. When the embodiment is applied to the 5G system, the RAN paging may be replaced with the RAN notification and the RAN paging area may be replaced with the RAN notification area.

(Additional Note 1)

Introduction

The new work item on Signalling reduction to enable light connection for LTE was agreed. According to the approved WID, the study phase is planned before the normative work and the objective in the initial phase is as follows.

In the study phase, investigate potential solutions for the following aspects, taking into account both UE mobility and traffic pattern:

Signalling reduction due to handover, considering UE centric mobility, e.g. cell (re)-selection.

Signaling reduction due to Paging, considering limiting the Paging transmission within a more limited area.

Signalling reduction to CN over S1 interface due to mobility and state transitions by hiding them from CN.

UE context storage and retrieval along with UE mobility across different eNBs.

Necessity of a new RAN based state.

From the perspective of RAN2, the Signalling reduction due to Paging is identified for the initial discussion of the study. In this additional note, possible issues in the current paging mechanism are discussed.

Discussion

The paging message is used to inform the UEs of the availability of MT calls, the notification of SI update, ETWS, CMAS, and EAB parameters modification, and the trigger of load redistribution. It was reported that the paging message makes up 26.8% of overall RRC signalling load, as statistics in practical LTE networks. Considering all IEs other than the paging information are defined with 1-bit encoding type such as ENUMERATED {true} in Paging, the paging information, i.e., pagingRecordList, is the dominant cause of the signalling load due to a paging message. So, it's effective to consider how the actual paging information contents can be reduced for MT calls, e.g., due to S1 PAGING. With such a reduction, it would be possible to reduce the number of transmitted bits within a paging message and the option for the NW to vary the number of the paging transmissions.

RAN2 should prioritize the study on the reduction of paging information conveyed within paging messages, i.e., the paging record lists.

RRC States

The easiest way to significantly reduce the number of paging messages would be to force all the UEs in a tracking area to stay in Connected, but it's also the wrong approach from the UE's power consumption point of view. So, this should not be used as the basis for signalling reduction of the paging message.

UEs should not be kept in RRC Connected, i.e., Rel-13 connected mode just to reduce the number of pages.

It also necessary to evaluate the RRC connection suspend/resume procedures, i.e., the UP solution for NB-IoT, although it's still an on-going discussion in RAN2. Based on the agreements so far, it may be assumed that the RRC connection resume is used for the UE to transition from IDLE to Connected, i.e., the UE stays in IDLE when the RRC connection is suspended. Thus, it is necessary for the NW to page the UE in the Suspend mode for MT calls. This means the gains from paging content reduction cannot be realized if the size of PagingUE-Identity is not significantly different, e.g., difference in the length between the resume ID and S-TMSI/IMSI is small. It is also necessary to consider the number of additional paging transmissions that may be needed as a result of the Suspend mode.

Even if the UE is in RRC Suspend mode, the NW will still need to page the UE for MT calls.

UE Mobility

Before Rel-13, paging messages were transmitted in all cells within a tracking area, regardless of whether the target UE(s) is actually located in the cell transmitting the message. In Rel-13, the paging optimizations were introduced by RAN3 and SA2 for the signalling reduction on Uu as well as S1, e.g., the Recommended Cells for Paging IE within S1 PAGING These Rel-13 mechanisms are efficient especially for UEs with low mobility, e.g., MTC UEs, but there may be a room for further optimizations considering UEs with normal mobility, e.g., smartphones. For example, even when the MME determines from/informs the eNB of the recommended eNB/cell within S1 PAGING based on its knowledge of Information On Recommended Cells And ENBs at transition to ECM IDLE, the UE upon this MT call may have already moved outside of the recommended eNB/cell. This would result in missed pages, and the resources used for the pages are wasted. It may be avoided if the eNB knows the UE's location, e.g., by means of a notification from the UE upon cell reselection. So, it's worth discussing how the eNB knows the location of the UE even in IDLE, to prevent unnecessary pages.

RAN2 should discuss if it's useful for the NW to know the location of UEs in IDLE.

(Additional Note 2)

1. Introduction

RAN2 starts their discussion on Signalling reduction to enable light connection for LTE. It was extensively discussed on the definition of Light Connection and the gain of paging enhancements, and finally a couple of working assumptions were agreed as follows.

Work assumption to study the paging enhancement is "S1 connection of a UE lightly connected is kept and active, in order to hide the mobility and state transitions from CN"

Work assumption: Light connected UE can be addressed only by the trigger of paging initiated by eNB or MME.

In this additional note, the details of paging enhancements and Light Connection are discussed, under the working assumptions.

2. Discussion

The paging message is used to inform the UEs of the availability of MT calls, the notification of SI update, ETWS, CMAS, and EAB parameters modification, and the trigger of load redistribution. It was reported that the paging message makes up 26.8% of overall RRC signalling load, as statistics in practical LTE networks. Considering all IEs other than the paging information are defined with 1-bit encoding type such as ENUMERATED {true} in Paging, the paging information, i.e., pagingRecordList, is the dominant cause of the signalling load due to a paging message. So, it's effective to consider how the actual paging information contents can be reduced for MT calls, e.g., due to S1 PAGING. With such a reduction, it would be possible to reduce the number of transmitted bits within a paging message and the option for the NW to vary the number of the paging transmissions.

Proposal 1: RAN2 should prioritize the study on the reduction of paging information conveyed within paging messages, i.e., the paging record lists.

2.1. RRC States and Modes 2.1.1. RRC Connected State

The easiest way to significantly reduce the number of paging messages would be to force all the UEs in a tracking area to stay in Connected, but it's also the wrong approach from the UE's power consumption point of view. So, this should not be used as the basis for signalling reduction of the paging message.

Proposal 2: UEs should not be kept in RRC Connected, i.e., Rel-13 connected mode, just to reduce the number of pages.

2.1.2. RRC Suspended Mode

It also necessary to evaluate the RRC connection suspend/resume procedures, i.e., the UP solution for NB-IoT, from the paging point of view. Based on the agreements so far, it's assumed that the RRC connection resume is used for the UE to transition from IDLE to Connected, i.e., the UE stays in IDLE when the RRC connection is suspended. For example, it's agreed that "UE in connected mode with AS security activated can be released into idle mode or idle mode with the suspend indication". In other words, the RRC Suspended mode is just a special condition of RRC IDLE.

Observation 1: RRC Suspended mode is a special condition of the UE in IDLE.

Thus, it is necessary for the NW to page the UE in the Suspend mode for MT calls, as similar with the UE in IDLE. This means the gains from paging content reduction cannot be realized if the size of PagingUE-Identity is not significantly different, e.g., difference in the length between the resume ID and S-TMSI/IMSI is small. It is also necessary to consider the number of additional paging transmissions that may be needed compared to Connected state, as a result of the Suspend mode.

Observation 2 Even if the UE is in RRC Suspend mode, the NW will still need to page the UE for MT calls.

2.1.3. RRC Light Connected Mode

As discussed above, LTE has two RRC states, i.e., Connected and IDLE, and a special condition of IDLE, i.e., Suspended mode. When the Light Connected is introduced, it should be discussed whether it's defined as a new RRC state or a special condition of the existing RRC state. If a new RRC state is defined, it's foreseen to define the transitions between three states, whole UE behaviours under the new state, the corresponding control messages and so on, wherein excessive standardization efforts will be necessary. From the simplicity point of view, RAN2 should stick to the current modelling with two RRC states, and therefore, the Light Connected should be defined as a special condition of Connected. This modelling could be well matched with the working assumption "S1 connection of a UE lightly connected is kept and active, in order to hide the mobility and state transitions from CN", which may assume ECM-Connected from the perspective of CN.

Proposal 3: Light Connected mode should be defined as a special condition of RRC Connected, not a new state, even if it's introduced.

2.2. Paging Enhancements 2.2.1. Issue in Paging Optimizations Due to UE Mobility Before Rel-13, paging messages were transmitted in all cells within a tracking area, regardless of whether the target UE(s) is actually located in the cell transmitting the message. In Rel-13, the paging optimizations were introduced by RAN3 and SA2 for the signalling reduction on Uu as well as S1, e.g., the Recommended Cells for Paging IE within S1 PAGING These Rel-13 mechanisms are efficient especially for UEs with low mobility, e.g., MTC UEs, but there may be a room for further optimizations considering UEs with normal mobility, e.g., smartphones. For example, even when the MME determines from/informs the eNB of the recommended eNB/cell within S1 PAGING based on its knowledge of Information On Recommended Cells And ENBs at transition to ECM IDLE, the UE upon this MT call may have already moved outside of the recommended eNB/cell. This would result in missed pages, and the resources used for the pages are wasted.

Observation 3: Paging optimizations introduced in Rel-13, e.g., the Recommended Cells for Paging IE within S1 PAGING, may work effectively only for stationary or low mobility UEs.

2.2.2. Expected Gains with Paging Enhancements

The working assumption mentions that "S1 connection of a UE lightly connected is kept and active, in order to hide the mobility and state transitions from CN", which also implies the UE is in ECM-Connected. In this case, the MME does not need to initiate the paging procedure when a DL data comes for the UE. So, at least from S1 signalling point of view, the signalling reduction will be achieved with a solution under the working assumption.

Observation 4: Signalling reduction of S1 PAGING could be achieved with Light Connected mode.

The various solutions with RAN-level paging mechanism were proposed. One of the benefits in the solutions is to limit the paging area. It indeed contributes to reduce number of paging messages in a whole network, if the RAN-level paging area is set to a subset of a tracking area. Similar gain may be achieved with a NW implementation today, e.g., the tracking area is configured with smaller region. But it has been pointed out that such a NW implementation will cause excessive Tracking Area Updates from UEs, whereby the overall signalling will likely increase.

Observation 5: Although the number of paging messages can be reduced if a smaller paging area is configured, excessive Tracking Area Updates may not be preventable.

From the observations above, the introduction of paging enhancements will offer much benefit and the baseline solution is for the introduction of RAN-level paging. Additionally, in the New RAT SI, many companies proposed to consider some kind of RAN-based paging mechanism to track UEs with low activity, in order to optimize the signalling and the performance for longer battery life. These obviously imply the current CN-based paging mechanism has some room for improvement and an area that needs to be considered in this WI. So, RAN2 should discuss further details of RAN-level paging mechanism.

Proposal 4: RAN2 should consider the details of RAN-level paging concept.

2.3. RAN-Level Paging Mechanism 2.3.1. Paging Message

If Proposal 4 is acceptable, the eNB may notice the necessity of paging upon arrival of DL data for the UE, instead of S1 PAGING. The working assumption mentions "Light connected UE can be addressed only by the trigger of paging initiated by eNB or MME", which suggests some sort of paging message is sent to the UE. From the U-plane data flow point of view, the difference at this point between the legacy paging (MME-initiated) and the new paging (eNB-initiated) is whether the DL data is still in the S-GW or already in the eNB, i.e., the routing in the CN is already done. So, it would be worth considering whether the paging message is really necessary in this case, although it's natural way that the eNB sends the (RAN-level) paging message to the UE. One of the other possibilities may aim to eliminate any paging messages over Uu. For example, the eNB sends the DL data immediately, instead of a page to the UE. If the DL data volume can be managed efficiently and is comparable to the amount of data needed for paging messages, the differences may be minimal from a spectral efficiency perspective. The details may be related to how to define the Light Connected mode, including mobility (UE-based or NW-based), thus should be FFS.

Proposal 5: RAN2 should discuss whether the UE should be paged with a paging message (as similar to today) or the direct DL data transmission.

2.3.2. Paging Area

It could also discussed that any transmission to page the UE is performed in a specific area, like the existing tracking area, and it's assumed as a group of cells, i.e., the paging area. It's straight forward to introduce such a concept to minimize paging failure. The paging area may be defined by availability of X2 connectivity for the UE context fetch, mobility state of the UE, balancing to spectral efficiency and so on, while it may be almost up to NW implementation.

Proposal 6: RAN2 should introduce the paging area, which consists of a group of cells to send a transmission to page the UE.

It may be assumed that the UE mobility is transparent to the eNB as long as the UE is within the paging area, On the other hand, it should be discussed how the UE behaves when it moves outside of the paging area. It's a reliable way to inform the serving cell when it happens, since it's quite similar to the existing Tracking Area Update. It's FFS whether the information is provided before the reselection of an outside cell or after it happens.

Proposal 7: RAN2 should discuss whether the UE should inform the serving cell when it moves outside of the paging area.

2.4. Alternative Consideration

As an alternative, the issue discussed in section 2.2.1 may be avoided if the eNB knows the UE's location, e.g., by means of a notification from the UE upon cell reselection. So, it's worth discussing how the eNB knows the location of the UE even in IDLE, to prevent unnecessary pages. It may be solved by the combination of the paging area, i.e., Proposal 6, and the information, i.e., Proposal 7.

Proposal 8: As an alternative to the RAN-level paging concept, RAN2 should discuss if it's useful for the NW to know the location of UEs in IDLE, when Rel-13 paging optimization is performed.

(Additional Note 3)

1. Introduction

In this additional note, the general issues in Light Connection other than paging aspects are identified.

2. Discussion

The working assumptions agreed in the last meeting uses the terminology "a UE lightly connected" or "Light connected UE", which is one step ahead of the WI title, i.e., Light Connection is somewhat related to UE's condition. The objective of WID also states "Necessity of a new RAN based state" and "the solution can consider reusing the Suspend/Resume procedure". So, it's one of important aspects how to model the light connection, e.g., reusing the RRC Suspend/Resume concept or introducing a new RRC state.

Observation 1: Modelling of Light Connection may be discussed together with paging enhancements.

Regardless of the modelling of Light Connection for paging, the following aspects could be discussed as agreed in the WID.

The solution shall apply for both mobile-originated and mobile-terminated data.

The solution shall enable the UE power consumption to be comparable to that one in RRC_IDLE.

In general, the features to be adopted for Light Connection should be compared against the existing features as discussed in the following sections.

2.1. General Features 2.1.1. Data Transmission and Reception Aspects (DL/UL/SL)

If the Light Connection is introduced, it needs to be clarified whether the Light connected UE is required to perform data transmission and reception, i.e., downlink (DL), uplink (UL) and sidelink (SL). In the existing IDLE mode, only SL is allowed with "softly" controlled by the eNB, i.e., Type 1 or Mode 2 transmission within the configuration provided in SIB18/19, while DL and UL needs the control signalling in advance, e.g., Paging, RACH and/or RRC Connection Request. In Connected mode, DL and UL are "tightly" controlled by the eNB, i.e., DL assignment and UL grant, while SL may require tight control, i.e., Type 2B or Mode 1 transmission by dedicated resource or SL grant, depending on the eNB's preference.

Proposal 1: RAN2 should discuss on what the UE behaviour is for data transmission/reception over Downlink, Uplink and Sidelink in Light Connection.

2.1.2. Measurements and Reporting Aspects (CSI/RLM/RRM)

UEs in Connected perform the various types of measurements, i.e., CSI measurement, RLM measurement and RRM measurement, as well as measurement feedback/reporting. On the other hand, UEs in IDLE only perform RRM measurement for cell reselection without reporting, i.e., UE-based mobility. With Light Connection, it is necessity to discuss which of these measurements and feedback/reporting needs to be supported, which should depend on whether Light Connection is more like CONNECTED or IDLE.

Proposal 2: RAN2 should discuss which measurement and reporting mechanisms, CSI feedback, RLM/RRM measurements, needs to be supported for Light Connection.

2.1.3. Activation and Deactivation Aspects (SCell, SPS)

The SCell(s) could be configured for Carrier Aggregation and Dual Connectivity, and these are activated or deactivated by e.g., the MAC Control Element. Also, SPS is configured for efficient delivery of e.g., VoLTE, and it's activated by PDCCH scrambled with SPS-RNTI. In the current specification, SCell(s)/SPS are de-configured when the UE transitions to IDLE, and it's reconfigured as needed when/after the UE transitions back to Connected. With Light Connection, it's also necessary to define whether SCell(s) and SPS are deactivated or even de-configured.

Proposal 3: RAN2 should discuss whether SCell(s) and SPS is deactivated or de-configured, when the UE transitions from CONN to Light Connection.

2.1.4. Assistance Information from UE Aspects

The current RRC supports many indications from the UE to assist with the eNB's functional control of various mechanisms, i.e., Proximity Indication, In-device Coexistence Indication, UE Assistance Information (Power Preference Indication), MBMS Interest Indication, MBMS Counting Response and Sidelink UE Information. In PHY layer, the sounding reference signal, SRS, is also used e.g., to estimate UL channel. In Light Connection, it is necessary to discuss if any of the indications should still be supported by the UE.

Proposal 4: RAN2 should discuss whether the UE in Light Connection continues the eNB assistance with Proximity Indication, In-device Coexistence Indication, UE Assistance Information, MBMS Interest Indication, MBMS Counting Response, Sidelink UE Information, and SRS.

2.2. Other Features 2.2.1. Dual Connectivity

In addition to SCell(s) discussed in section 2.1.3, it may be defined whether PSCell should be de-configured when the UE moves into Light Connection. If the PSCell is still applicable in Light Connection, it should also be discussed whether SCG Failure Indication needs to be declared.

Proposal 5: RAN2 should discuss whether PSCell is de-configured, when the UE moves into Light Connection.

2.2.2. WLAN Interworking/Aggregation (RALWI, RCLWI, LWA, LWIP)

In Rel-12 and Rel-13, a couple of mechanisms for WLAN Interworking were developed, i.e. RAN-assisted and RAN-controlled LTE-WLAN Interworking solutions, RALWI/RCLWI. The LWI mechanisms allow the NW to control UE in Connected its traffic steering to/from WLAN by the dedicated RAN assistance parameter or the steering command. After the UE transitions to IDLE, the configuration, which was set when the UE was in Connected, is still applicable during T350 is running. In addition for RALWI, SIB17 may provide the RAN assistance parameters and controls the UE in IDLE as well as in Connected. It should be further discussed how the UE performs RALWI/RCLWI under Light Connection.

Proposal 6: RAN2 should discuss how the UE performs RALWI/RCLWI during Light Connection.

In Rel-13, a set of WLAN aggregation solutions were specified, i.e., LTE-WLAN Aggregation (LWA) and one using IPsec tunnel (LWIP). The LWA bearer is routed over WLAN link and terminated at the eNB and the UE. Considering the Light Connection over Uu, it also needs to be clarified how the LWA configuration and LWA bearer(s) are handled when the UE is in Light Connection.

Proposal 7: RAN2 should discuss how the LWA bearer(s) is handled in Light Connection.

2.2.3. MDT

The minimization of drive test, MDT, was introduced in Rel-10 and continuously enhanced onward. The MDT consists of two modes, i.e., Logged MDT for IDLE/Connected modes and Immediate MDT for Connected mode. The MDT measurement log is sent over the measurement reporting when the UE is in Connected, wherein the logging continued even if the UE is in IDLE, in case of Logged MDT. For Light Connection, it has to be discussed which MDT mode is supported.

Proposal 8: RAN2 should discuss which MDT mode is supported for UEs in Light Connection.

2.2.4. MCLD

The multi-carrier load distribution, MCLD, supports the two redistribution mechanisms, the continuous redistribution scheme (CRS) and the one-shot scheme (OSS). These mechanisms is provided the redistribution parameter in SIB3/SIB5, and the UE in IDLE selects the redistribution target according to its IMSI upon either T360 expiry (CRS) or reception of the redistribution indication within the paging (OSS). For Light Connection, the load redistribution mechanisms may be applicable since current assumption is that the UE should perform UE-based mobility.

Proposal 9: RAN2 should discuss whether load redistribution is supported in Light Connection.

In addition to above, it may also have to discuss whether any enhancements are needed in the current features due to the introduction of Light Connection, e.g., some special handling such as an implicit deactivation/de-configuration.

Proposal 10: Additionally, RAN2 should also discuss whether any enhancements are necessary for the existing features due to the introduction of Light Connection.

The invention claimed is:

1. A user equipment used in a mobile communication system, the user equipment comprising:
  a receiver configured to receive, from a base station included in a network, a radio resource control (RRC) release message that causes the user equipment to transition to an RRC inactive state in which context information of the user equipment is maintained in the network, wherein the RRC inactive state is a different state from an RRC connected state and an RRC idle state, and wherein the RRC release message includes a list of a plurality of cell identifiers identifying a plurality of cells configured as a predetermined area as information indicating the predetermined area;
  at least one processor configured to recognize, based on the list of the plurality of cell identifiers included in the RRC release message, a movement of the user equipment to the outside of the predetermined area while the user equipment is in the RRC inactive state; and
  a transmitter configured to transmit, to the network, a notification indicating the movement in response to recognizing the movement of the user equipment to the outside of a predetermined area, wherein
  the RRC release message includes information indicating a DRX (Discontinuous Reception) cycle to be applied for the user equipment in the RRC inactive state.

2. The user equipment according to claim 1, wherein the predetermined area is an area unit consisting of a cell of the base station, and a cell of another base station connected to the base station via an inter-base station interface.

3. The user equipment according to claim 1, wherein the transmitter is configured to transmit, to the network, the notification by an RRC signaling in response to recognizing the movement of the user equipment to the outside of the predetermined area.

4. The user equipment according to claim 1, wherein the receiver is further configured to receive an identifier allocated by the base station, and the transmitter is configured to transmit, to the network, the notification including the allocated identifier.

5. The user equipment according to claim 1, wherein the RRC inactive state is an Inactive state defined in a 5th generation mobile communication system.

6. A method performed at a user equipment used in a mobile communication system, the method comprising:
  receiving, from a base station included in a network, a radio resource control (RRC) release message that causes the user equipment to transition to an RRC inactive state in which context information of the user equipment is maintained in the network, wherein the RRC inactive state is a different state from an RRC connected state and an RRC idle state, and wherein the RRC release message includes a list of one or more cell identifiers identifying a plurality of cells configured as a predetermined area as information indicating the predetermined area;
  recognizing, based on the list of one or more cell identifiers included in the RRC release message, a movement of the user equipment to the outside of the predetermined area while the user equipment is in the RRC inactive state; and
  transmitting, to the network, a notification indicating the movement in response to recognizing the movement of the user equipment to the outside of a predetermined area, wherein
  the RRC release message includes information indicating a DRX (Discontinuous Reception) cycle to be applied for the user equipment in the RRC inactive state.

7. The user equipment according to claim 1, wherein the RRC release message includes information indicating a value of a timer used for performing an RRC resume procedure, and
  the at least one processor is configured to
    start the timer upon receiving the RRC release message, and
    perform the RRC resume procedure when the timer expires.

* * * * *